(12) United States Patent
Swan et al.

(10) Patent No.: US 7,156,305 B2
(45) Date of Patent: Jan. 2, 2007

(54) APPARATUS AND METHOD FOR AUTHENTICATING PRODUCTS

(75) Inventors: Richard James Swan, Portola Valley, CA (US); Shantha Mohan, Palo Alto, CA (US); David Sun, San Jose, CA (US); Alexander Varshavsky, San Francisco, CA (US); Karthik Mohanram, Sunnyvale, CA (US)

(73) Assignee: T3C Inc., Mountain View, CA (US)

( * ) Notice: Subject to any disclaimer, the term of this patent is extended or adjusted under 35 U.S.C. 154(b) by 0 days.

(21) Appl. No.: 11/198,002

(22) Filed: Aug. 5, 2005

(65) Prior Publication Data

US 2006/0138221 A1    Jun. 29, 2006

Related U.S. Application Data

(60) Provisional application No. 60/639,019, filed on Dec. 23, 2004.

(51) Int. Cl.
*G06F 19/00* (2006.01)
(52) U.S. Cl. .................... 235/385; 235/383; 235/375; 235/381
(58) Field of Classification Search ............... 235/385, 235/383, 375, 381
See application file for complete search history.

(56) References Cited

U.S. PATENT DOCUMENTS

| | | | |
|---|---|---|---|
| 5,856,931 A * | 1/1999 | McCasland | 702/182 |
| 6,318,636 B1 * | 11/2001 | Reynolds et al. | 235/472.01 |
| 6,415,978 B1 * | 7/2002 | McAllister | 235/462.01 |
| 6,523,752 B1 * | 2/2003 | Nishitani et al. | 235/462.44 |
| 6,563,417 B1 * | 5/2003 | Shaw | 340/10.1 |
| 6,677,852 B1 * | 1/2004 | Landt | 340/10.1 |
| 7,053,777 B1 * | 5/2006 | Allen | 340/572.1 |
| 2002/0005774 A1 * | 1/2002 | Rudolph et al. | 340/5.61 |
| 2002/0183882 A1 * | 12/2002 | Dearing et al. | 700/115 |
| 2003/0034390 A1 * | 2/2003 | Linton et al. | 235/382 |
| 2004/0178264 A1 * | 9/2004 | Linton et al. | 235/385 |

* cited by examiner

*Primary Examiner*—Kimberly D. Nguyen
(74) *Attorney, Agent, or Firm*—Cooley Godward KronishLLP

(57) ABSTRACT

A computer readable medium including executable instructions to analyze radio frequency (RF) tag information includes executable instruction to access cross-enterprise RF tag information, identify a product transition based upon the cross-enterprise RF tag information, and define a new product path based upon the product transition, where the new product path defines product pedigree information. Additional executable instructions authenticate a user, secure product information, supply product pedigree information corresponding to the product information, and verify the pedigree of the product based upon the product pedigree information.

11 Claims, 15 Drawing Sheets

| Row | Src | Loc | BP | BizFunction | SupplyFunction | Transit | Site |
|---|---|---|---|---|---|---|---|
| 1 | src:217.100 | loc:217.1 | bp:217 | Retail | BackRoom | Retail_In | WM:217 |
| 2 | src:217.104 | loc:217.2 | bp:217 | Retail | FrontRoom | Retail_Other | WM:217 |
| 3 | src:217.105 | loc:217.3 | bp:217 | Retail | Crusher | Retail_Other | WM:217 |
| 4 | src:217.112 | loc:217.2 | bp:217 | Retail | FrontRoom | Retail_Other | WM:217 |
| 5 | src:217.113 | loc:217.2 | bp:217 | Retail | FrontRoom | Retail_Other | WM:217 |
| 6 | src:421.100 | loc:421.1 | bp:421 | Retail | BackRoom | Retail_In | WM:421 |
| 7 | src:421.104 | loc:421.2 | bp:421 | Retail | FrontRoom | Retail_Other | WM:421 |
| 8 | src:6068.100 | loc:6068.1 | bp:6068 | Distribution | Distribution_In | Distribution_In | WMDC:6068 |
| 9 | src:6068.101 | loc:6068.1 | bp:6068 | Distribution | Distribution_Out | Distribution_other | WMDC:6068 |
| 10 | src:6068.102 | loc:6068.2 | bp:6068 | Distribution | Depal | Distribution_other | WMDC:6068 |
| 11 | src:6068.103 | loc:6068.2 | bp:6068 | Distribution | Low_Speed | Distribution_other | WMDC:6068 |
| 12 | src:222222222.1 | loc:222222222.1 | bp:222222222 | Manufacturing | Manuf_Out | Manufacturing | HP:D714 |
| 13 | src:222222222.2 | loc:222222222.2 | bp:222222222 | Manufacturing | Manuf_Out | Manufacturing | HP:D714 |

*FIG. 5*

| Current Event | PriorDesignation | CurrentDesignation | Path |
|---|---|---|---|
| At start | " " | " " | " " |
| E1 | Manufacturing | Manufacturing | Manufacturing |
| E2 | Manufacturing | Distribution | Manufacturing → Distribution |
| E3 | Distribution | Distribution | Manufacturing → Distribution |
| E4 | Distribution | Distribution | Manufacturing → Distribution |
| E5 | Distribution | Distribution | Manufacturing → Distribution |
| E6 | Distribution | Retail | Manufacturing → Distribution → Retail |
| E7 | Retail | Retail | Manufacturing → Distribution → Retail |
| E8 | Retail | Retail | Manufacturing → Distribution → Retail |

| Details | | | |
|---|---|---|---|
| Lot Number | 20 | | |
| Expiration | | | |
| Lost Location sighted | Texas Cancer Center Receiving | | |
| ☑ Recalled | No | | |
| ☑ Damaged | No | | |
| ☑ Sample Product | No | | |
| ☑ Stolen | No | | |
| ☑ Onhold | No | | |
| ☑ Expired | No | | |
| ☑ Returned | No | | |
| ☑ Quarantined | No | | |
| ☑ Lost | No | | |
| ☑ Destroyed | No | | |

Pedigree

| | Event | Location | CA License # | Date |
|---|---|---|---|---|
| 1 | COMMISSION sgtin:011146... | PSGA Raritan Commiss.... | # License Number | 2004-08-30 21:37:04 |
| 2 | COMMISSION sgtin:011146... | JOM Distribution Ship | # License Number | 2004-08-30 22:35:04 |
| 3 | PACK sgtin:011146.0986890... | JOM Distribution Ship | # License Number | 2004-08-30 22:37:04 |
| 4 | SHIP sgtin:011146.0986890... | JOM Distribution Ship | # License Number | 2004-09-02 23:10:00 |
| 5 | RECEIVE sgtin:011146.0986... | Priority Healthcare Cor... | # License Number | 2004-09-03 10:50:00 |
| 6 | UNPACK sgtin:011146.09868... | Priority Healthcare Cor... | # License Number | 2004-09-03 11:24:00 |
| 7 | SHIP sgtin:011146.0986889... | Priority Healthcare Cor... | # License Number | 2004-09-04 11:24:00 |
| 8 | RECEIVE sgtin:011146.0986... | Texas Cancer Center B... | # License Number | 2004-09-05 09:22:00 |

FIG. 14

This product may have potential problems. Please take the following steps:
* Immediately quarantine this product.
* Do not administer the product until this discrepancy is resolved.
* In reporting this discrepancy, the information listed in the form on the right will be required.
* Prior to calling the Medical Information at 1-800-325-7504, please make sure the information you have collected is thorough and complete.
* In addition to calling the above number, you can also print the form and fax to 1-888-888-8889.

The item was found with the problem:

| Previously Administered | |
|---|---|
| Product Code | sgtin:011146.0986889.33488902 |
| Product | PROCRIT 40,000 Units/mL |
| Description | 40,000 Units/mL (NDC 59676-340-01 |

Specifics Requested — To be completed by the reporting authority

Contact Name
Company Name
Street Address
City
State
ZipCode
Phone # (   )   -

| | | |
|---|---|---|
| 1 | Where was this material purchased? | -please select- |
| 2 | Invoice # | |
| 3 | When did it arrive at your location? | |
| 4 | Are there more units in stock? | -please select- |
| 5 | Have you administered any from this shipment already? | |

*FIG. 15*

* Do not administer the product until this discrepancy is resolved.
* In reporting this discrepancy, the information listed in the form on the right will be required.
* Prior to calling the Medical Information at 1-800-325-7504, please make sure the information you have collected is thorough and complete.
* In addition to calling the above number, you can also print the form and fax to 1-888-888-8889.

Specifics Requested | To be completed by the reporting authority

| | | |
|---|---|---|
| 1 | Where was this material purchased? | Contact Name: George Martin<br>Company Name: Priority Health Care<br>Street Address: 250 Technology Park<br>City: Lake Mary<br>State: FL<br>ZipCode: 32746-<br>Phone #: (800) 892- |
| 2 | Invoice # | TCC000123 |
| 3 | When did it arrive at your location? | Sep 5, 2004 |
| 4 | Are there more units in stock? | yes |
| 5 | Have you administered any from this shipment already? | no |

Sep 2004
| S | M | T | W | T | F | S |
|---|---|---|---|---|---|---|
| | | | 1 | 2 | 3 | 4 |
| 5 | 6 | 7 | 8 | 9 | 10 | 11 |
| 12 | 13 | 14 | 15 | 16 | 17 | 18 |
| 19 | 20 | 21 | 22 | 23 | 24 | 25 |
| 26 | 27 | 28 | 29 | 30 | | |

I acknowledge that I have seen and read the problem:
▽ Previously administered reported on sgtin:011146.0986889.33488902

User Name: SM
User Password: **********

Submit

APPARATUS AND METHOD FOR AUTHENTICATING PRODUCTS

CROSS REFERENCE TO RELATED APPLICATIONS

This application claims priority to U.S. Provisional Patent Application 60/639,019, filed Dec. 23, 2004, entitled, "Apparatus and Method for Analyzing Cross-Enterprise Radio Frequency Tag Information".

BRIEF DESCRIPTION OF THE INVENTION

This invention relates generally to authenticating products, such as pharmaceutical products. More particularly, this invention relates to analyzing radio frequency tag information along with other information, such as serialized identification, history, and physical characteristic information to authenticate products.

BACKGROUND OF THE INVENTION

FIG. 1 illustrates a supply chain 100. A set of manufacturers, 102_1 and 102_2, distribute products to a set of warehouses 104_1 and 104_2, respectively. Warehouse 104_1 then distributes products to first and second distributors 106_1 and 106_2, while warehouse 104_2 distributes products to third and fourth distributors 106_3 and 106→4. The first distributor 106_1 then distributes products to one or more retail outlets, such as a first retailer 108_1. The remaining distributors distribute products to retails 108_2, 108_3, and 108_4.

Arrows 110 illustrate the insertion of counterfeit goods into the supply chain 100. In one case, counterfeit goods are introduced at a warehouse 104_2 and in another case counterfeit goods are introduced at a distributor 106_4. In either case, enterprises downstream from the counterfeit insertion event have a difficult time identifying the counterfeit goods.

Arrow 112 illustrates a possible path for an improper resale or return of an item. In this case, the distributor 106_2 is bypassed and therefore the resale and return rules potentially enforced by the distributor 106_2 are bypassed.

Arrows 114 illustrate potential improper import paths into the supply chain 100. In this case, distributor 106_1 and retailer 108_1 directly receive improperly imported goods. Thus, import restrictions to be enforced by warehouses 104 are bypassed.

The foregoing supply chain abuses and many other supply chain abuses are coming under increasing scrutiny. In addition, there is growing interest in tracking product movement to optimize legitimate supply chain operations. For example, improved information on the movement of a product through a supply chain allows enterprises to more closely analyze trends in product consumption. This allows enterprises to implement the supply chain more efficiently. In addition, more comprehensive supply chain information allows more accurate predictions of future consumption patterns.

The potential to thwart supply chain abuses and to improve supply chain efficiency has led various government agencies and large commercial enterprises to require the use of radio frequency (RG) tags. A radio frequency tag is analogous to a bar code in the sense that it is used to uniquely identify a product. However, where a bar code relies upon a visual pattern to uniquely identify a product, an RF tag uses an RF signal signature to uniquely identify a product. An RF tag reader or scanner adjacent to an RF tag records the presence of the RF tag. The reader or scanner can then deliver RF tag information to a database, allowing the RF tag information to be processed.

While the use of RF tags within a single enterprise (e.g., a manufacturer, a warehouse, a distributor, or a retailer) is known, there are many challenges associated with the use of RF tags across enterprises (e.g., tracking RF tag information from a manufacturer through a retailer). One problem with cross-enterprise analysis is efficient processing of the vast amount of information associated with the movement of multiple products through multiple tiers of multiple supply chains.

Supply chain abuses are coming under increasing scrutiny, especially in industries where the abuse can lead to the loss of human lives. Recently, the number of investigations by the U.S. Food and Drug Administration (FDA) into counterfeit pharmaceuticals has increased to over 20 per year, after averaging only 5 per year through the late 1990's. Counterfeit drugs pose significant public health and safety hazards. Counterfeit products may contain only inactive ingredients, incorrect ingredients, improper dosages, sub-potent or super-potent ingredients, or contaminated materials. As a result, patients may be put at risk for serious adverse health consequences. For example, Procrit™, a drug used by cancer and AIDS patients, was recently counterfeited and the drug was replaced with non-sterile tap water, which could have caused sever bloodstream infections.

The FDA is aggressively pursuing anti-counterfeit measures, including: unit of use packaging, tamper evident packaging, authentication technologies, listing of high potential counterfeit drugs, and RFID tracking.

The Food, Drug and Cosmetic ACT (FDCA) requires the FDA to regulate drug manufacturers and to approve drugs for sale. This federal law also requires state governments to regulate the drug distribution system by licensing and regulating drug wholesalers. A number of states are working on bills to regulate the pharmaceutical supply chain. For example, a California bill (SB 1307) is expected to solve the following problems: (1) Counterfeit products introduced by repacking of drugs by licensed wholesalers and pharmacists. (2) Drugs that have been diverted and travel circuitous routes through facilities with minimal or non-existent records before reaching their final destination, which makes them untraceable. (3) Improper actions by "closed" pharmacies, which fill prescriptions for specific patient populations (commonly skilled nursing care facilities), but do not fill prescriptions for the general population. These organizations periodically sell the below market price drugs that they acquire to secondary wholesales, who in turn sell the drugs in the general market. There have been cases where legitimate wholesalers have unknowingly purchased counterfeit drugs in the secondary market and resold them to pharmacies. (4) The absence of a "pedigree" is a principal challenge in ensuring the integrity of the drug distribution system. A pedigree is a history of all the transactions related to an individual product (e.g., container of drugs). Currently, there is no effective means to verify the source and the history of any given bottle of drugs sitting on a pharmacy shelf. (5) Distribution channels for prescription drugs is not straightforward, sometimes involving circuitous paths from manufacturers, wholesalers, re-packagers, institutional pharmacies, closed door pharmacies, and foreign markets.

SB 1307 is sponsored by the California Board of Pharmacy to substantially decrease the threat of counterfeit drugs and drug diversion. Much of this proposal draws from recently adopted laws in Nevada and Florida and from recent draft revisions to model laws published by the National Association of Boards of Pharmacy. The proposal is designed to address challenges presented by the existing distribution system for prescription drugs. Techniques will be required to comply with new regulatory safeguards, such as those pending before various legislatures.

In view of the foregoing, it would be highly desirable to provide a technique for authenticating products, such as pharmaceutical drugs.

SUMMARY OF THE INVENTION

The invention includes a computer readable medium with executable instructions to analyze radio frequency (RF) tag information. The executable instructions include executable instructions to access cross-enterprise RF tag information, identify a product transition based upon the cross-enterprise RF tag information, and define a new product path based upon the product transition, where the new product path defines product pedigree information. Additional executable instructions authenticate a user, secure product information, supply product pedigree information corresponding to the product information, and verify the pedigree of a product based upon the product pedigree information.

The invention also includes a method of authenticating a product. The method includes authenticating a user, securing product information, linking the product information to product pedigree information derived from cross-enterprise RF tag information, supplying the product pedigree information, and verifying the pedigree of a product based upon the product pedigree information.

BRIEF DESCRIPTION OF THE FIGURES

The invention is more fully appreciated in connection with the following detailed description taken in conjunction with the accompanying drawings, in which:

FIG. 5 illustrates exemplary RF tag information that may be processed in accordance with an embodiment of the invention.

FIG. 6 illustrates product paths corresponding to the data of FIG. 5.

FIG. 11 illustrates product pedigree information supplied in accordance with an embodiment of the invention.

FIG. 14 illustrates a user interface that may be used in the event of failed authentication.

FIG. 15 illustrates a user interface that may be used to submit discrepancy information in accordance with an embodiment of the invention.

Like reference numerals refer to corresponding parts throughout the several views of the drawings.

DETAILED DESCRIPTION OF THE INVENTION

Figure 1:
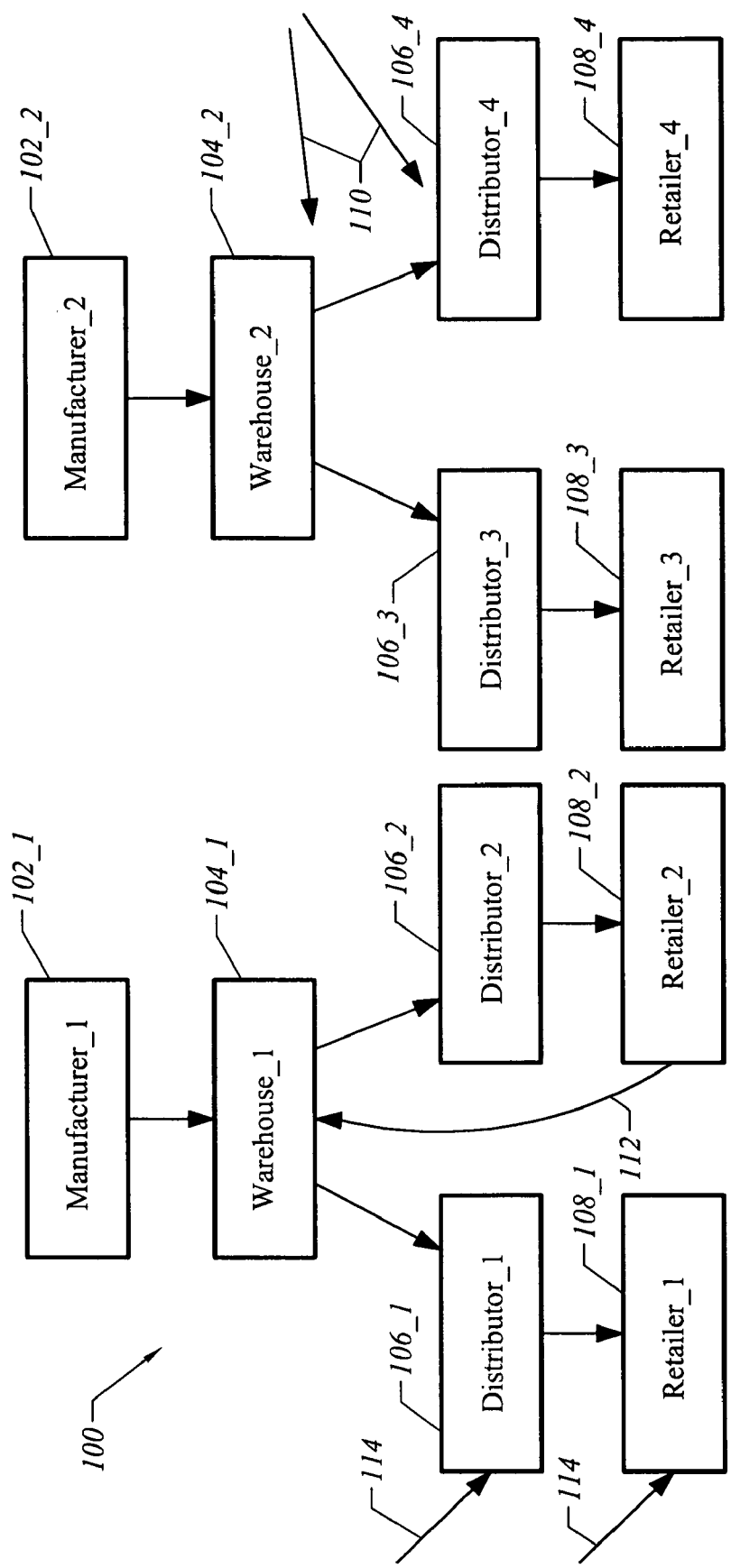
FIG. 1 illustrates a prior art supply chain.
Figure 2:
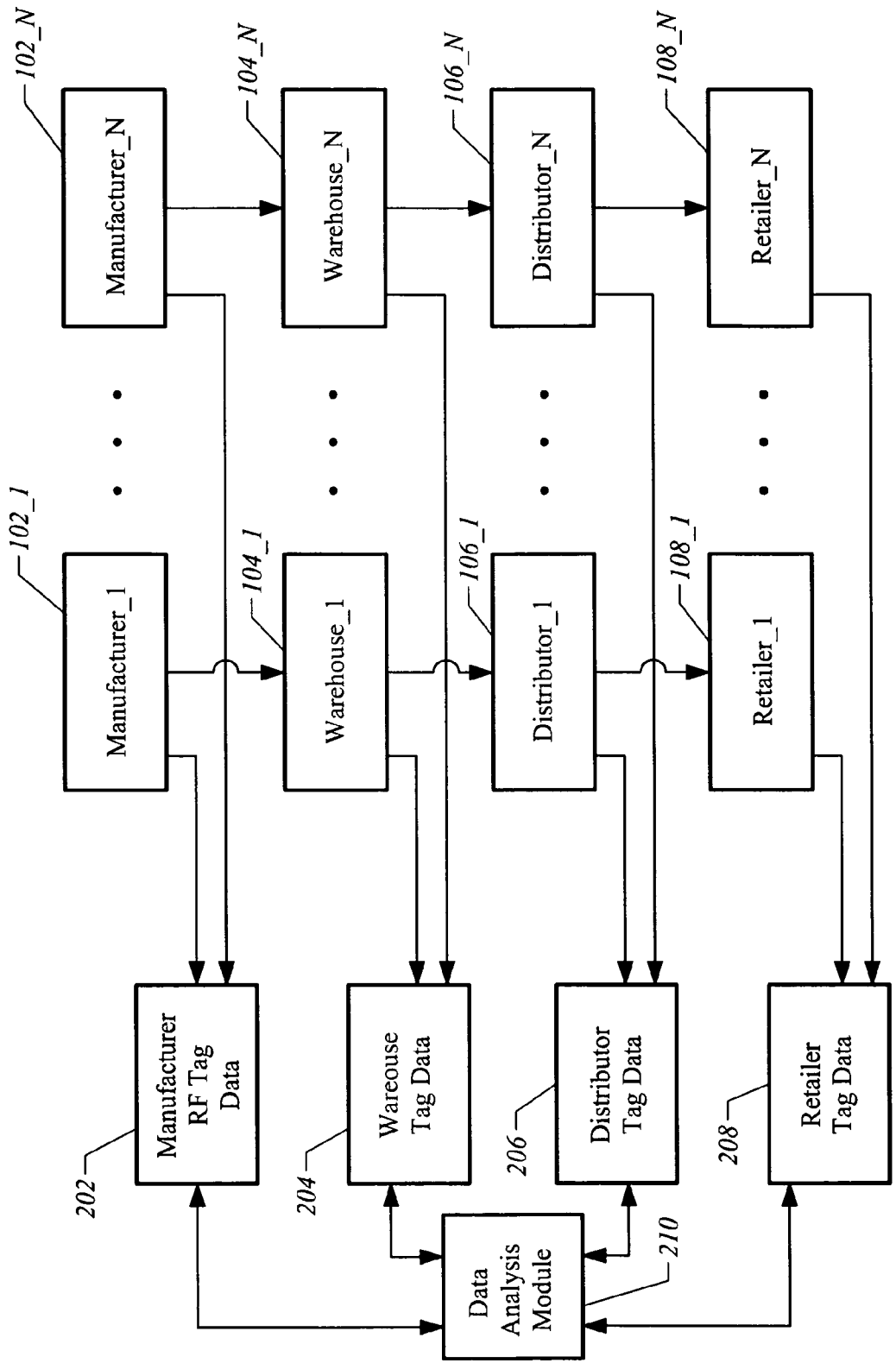
FIG. 2 illustrates the routing of RF tag information from a supply chain for processing in accordance with an embodiment of the invention.

FIG. 2 illustrates a supply chain 200 utilizing RF tag information. Manufacturers 102_1 through 102_N produce RF tag information upon manufacturing products. For example, a manufacturer produces a product, places a tag on the product, and then uses an RF scanner to record a product number and attributes associated with the product (e.g., date manufactured, location manufactured, type of product, and the like). This RF tag information is routed to a repository to form manufacturer RF tag data 202.

When the manufactured products are moved to warehouses, RF tag data are accumulated. In particular, warehouses 104_1 through 104_N generate warehouse tag data 204. In a similar manner, when the same products are moved to distributors, more RF tag data are accumulated for the products. In particular, distributors 106_1 through 106_N generate distributor tag data 206. Finally, when the products are moved to the retail level, more RF tag data are accumulated. FIG. 2 illustrates that retailers 108_1 through 108_N produce retailer tag data 208.

A data analysis module 210, configured in accordance with an embodiment of the invention, processes the cross-enterprise RF tag data. The data analysis module 210 facilitates "horizontal" (i.e., across a row of the supply chain, such as all manufacturers) data analyses as well as "vertical" (e.g., down a column of the supply chain, such as from a manufacturer to a retailer) data analyses.

Figure 3:
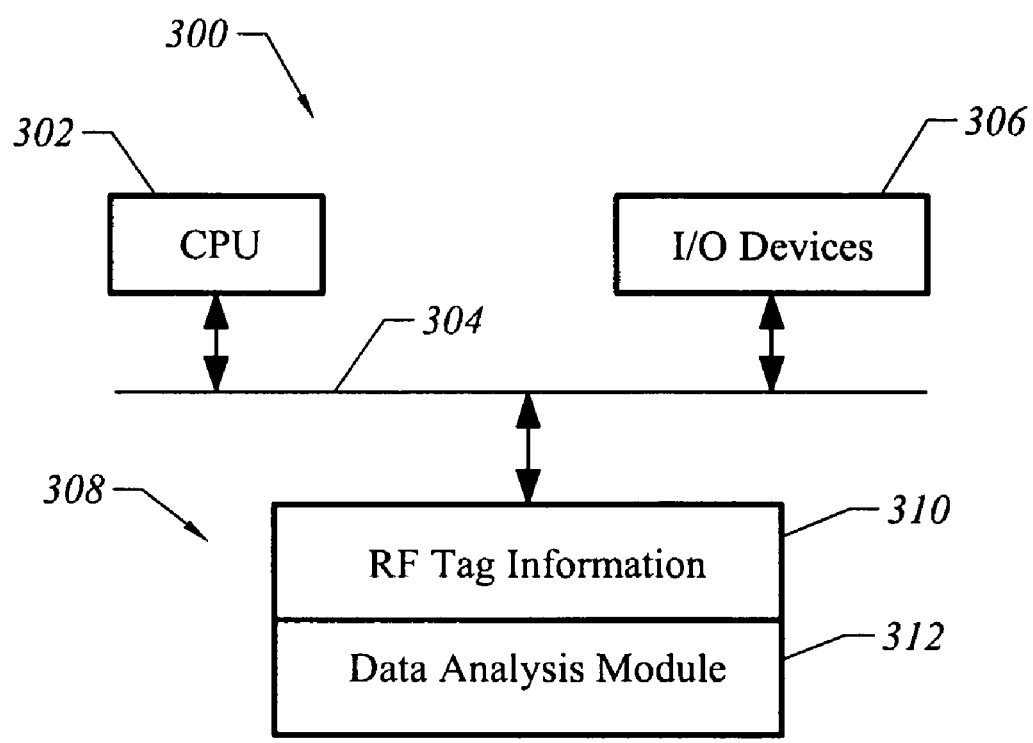
FIG. 3 illustrates a computer configured in accordance with an embodiment of the invention.

FIG. 3 illustrates a computer 300 configured in accordance with an embodiment of the invention. The computer 300 includes standard components including a central processing unit 302, which is connected to a bus 304. Also connected to the bus 304 are input/output devices 306. The input/output devices 306 may include a keyboard, mouse, monitor, printer, and the like. In addition, the input/output devices 306 include network interfaces to communicate with a network of computers generating RF tag data. So, for example, the input/output devices 306 are connected to one more data repositories storing manufacturer tag data 202, warehouse tag data 204, distributor tag data 206, and retailer tag data 208.

A memory 308 is also connected to the bus 304. The memory 308 stores RF tag information 310, such as RF tag information that is accessed through the input/output devices 306. A data analysis module 312 processes the RF tag information. The data analysis module includes executable instructions to implement the RF tag processing functions described herein.

Figure 4:
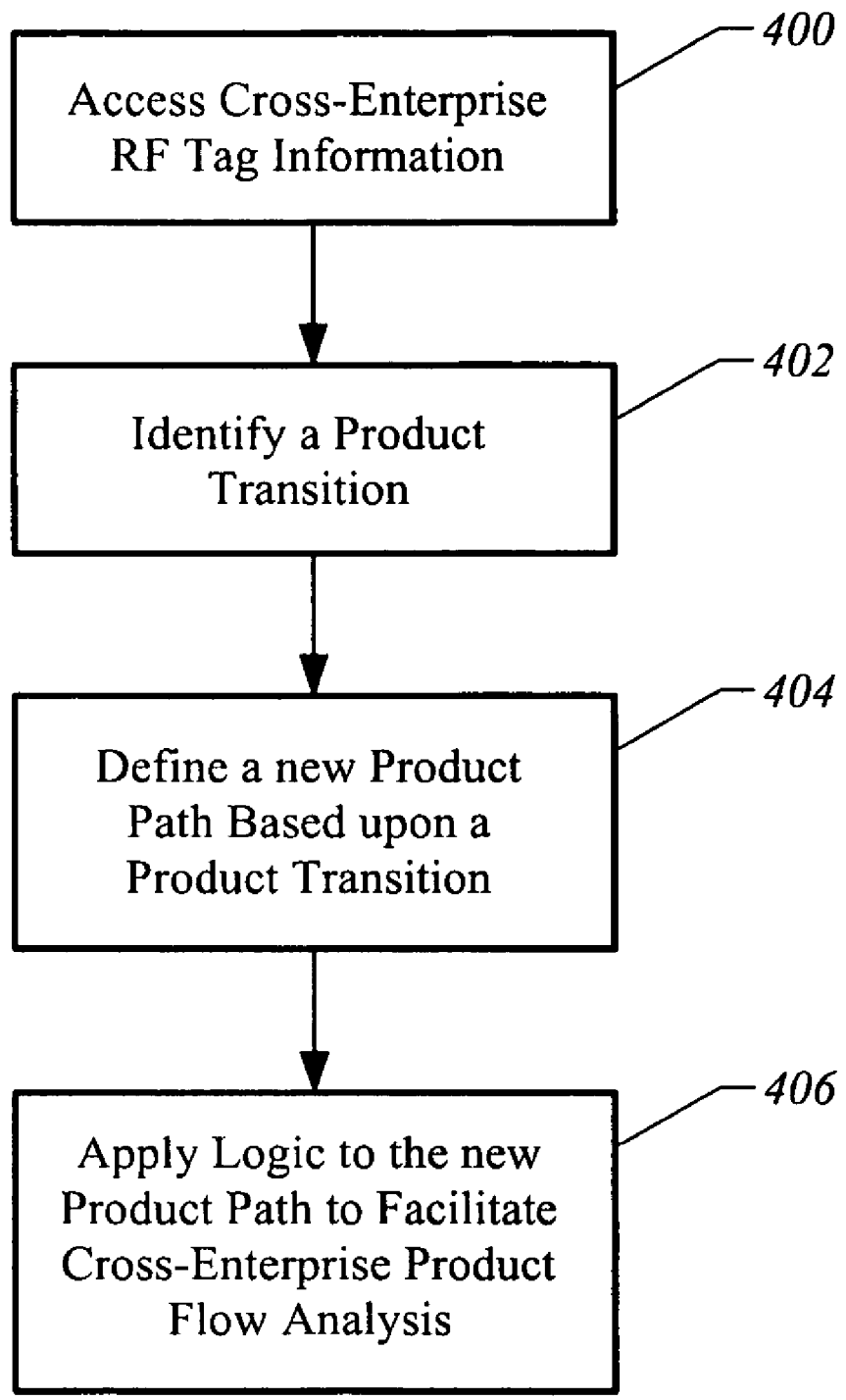
FIG. 4 illustrates processing operations associated with an embodiment of the invention.

FIG. 4 illustrates processing operations associated with one embodiment of a data analysis module of the invention. The first processing operation of FIG. 4 is to access cross-enterprise RF tag information 400. As used herein, the term cross-enterprise RF tag information includes "horizontal" cross-enterprise RF tag information (e.g., from one warehouse to another) and "vertical" cross-enterprise RF tag information (e.g., from a warehouse to a distributor to a retailer).

The cross-enterprise RF tag information is processed to identify a product transition 402. A product transition represents the movement of a product across enterprises, either horizontally or vertically.

A new product path is then defined based upon a product transition 404. Logic is then applied to the new product path to facilitate cross-enterprise product flow analysis 406. The foregoing operations are more fully appreciated in connection with some specific examples.

The invention can be used in connection with a variety of RF tag information. For example, the RF tag information may relate to events, such as:
Commission tag
Sight tag
Pack tag into higher level assembly
Unpack
Ship
Receive
Product Return
Product Recall
Warrantee Claim
Medical Reimbursement Claim The RF tag information may relate to sources, such as:
Map to location
Default Action
Authorized Operations The RF tag information may also relate to locations, such as:
Company/Division/Region/Site/Area/SubArea
Transit bins
Business Function Performed
   Manufacture
   Distribution Level
   Retail The RF tag information can have historical components, such as:
Sequence of sightings
Sequence of Hierarchical Locations
Time periods spent at each location In accordance with the invention, the movement of a tagged object can be viewed at many levels or within many dimensions. For example, the following basic information may be available:

Jan 1 2004 10:00 Commission Big.Cinncinatti.plant3.room2→
Jan 1 2004 11:20 Pack Big.Cincinnatti.plant3.room4→
Jan 3 2004 07:30 Sight NationWide.Colorado>Denver#2.receiving→
Jan 4 2004 14:03 Ship NationWide.Colorado>Denver#2.shipping→
Jan 7 2004 15:27 Receive GroceryExpress.Atlanta.dock3→
Jan 8 2004 08:53 Sight GroceryExpress.Atlanda.storage.room27→
Jan 8 2004 13:11 Ship GroceryExpress. Atlanta.Shipping4→
Jan 12 2004 16:44 Receive EasyStop.Canada.Toronto.BackRoom→
Jan 15 2004 15:48 Sight EasyStop. Canada.Toronto.FrontRoom This example can be used to illustrate various path dimensions that may be exploited in accordance with the invention. The use of paths facilitates different analyses in accordance with the invention. The use of paths allows various amounts of data to be processed, either with fine resolution for detailed paths or course resolution for more general paths. Consider the following detailed paths defining the location of the tagged object in this example.

Big.Cinncinatti.plant3.room2→
Big.Cincinnatti.plant3.room4→
NationWide.Colorado.Denver#2.receiving→
NationWide.Colorado.Denver#2.shipping→
GroceryExpress.Atlanta.dock3→
GroceryExpress. Atlanta.storage.room27→
GroceryExpress. Atlanta.Shipping4→
EasyStop.Canada.Toronto.BackRoom→
EasyStop. Canada.Toronto.FrontRoom Now consider a more generalized path that effectively filters or reduces the amount of data. Instead of all locations, as in the previous example, this example tracks corporate level locations.

Big→NationWide→GroceryExpress→EasyStop

For the same example, paths can be considered at a functional level:
Manufacturer→Manufacturer→DistributorLevel1→DistributorLevel1→DistributorLevel2→DistributorLevel2→Retail→Retail The same example can be used to define paths at a national boundary level:
USA→USA→USA→USA→USA→USA→USA→Canada→Canada The same example can be used to define paths at an individual operation level:
Commission→Pack→Sight→Sight→Receive→Sight→Ship→Receive→Sight The same example can be used to define paths by absolute time:
Jan 1 2004 10:00→
Jan 1 2004 11:20→
Jan 3 2004 07:30→
Jan 4 2004 14:03→
Jan 7 2004 15:274→
Jan 8 2004 08:53→
Jan 8 2004 13:11→
Jan 12 2004 16:44→
Jan 15 2004 15:48

Paths can also be defined by the amount of time between transitions. Thus, in the foregoing example, the following path results:
0:0:00→0:1:20→1:06:27→3:01:25→0:17:26→0:04:42→4:03:33→3:23:04

The foregoing example can also be used to create a path for tag locations as categorized as transit times (time between sites):
1:06:27→3:01:25→4:03:33

As will be described in detail below, these various paths may be characterized through regular expressions and/or other techniques. Path expression is used in accordance with the invention to limit the amount of data that needs to be processed, thereby facilitating cross-enterprise analyses.

Various techniques may be used to form any given path. Consider the raw RF tag data of FIG. 5. Each row characterizes an RF tag event, specifying a tag reading source, the location for the tag reading source, a business process (BP) code, a business function (BizFunction) associated with this level of the supply chain, a supply function associated with this level of the supply chain, transit characterization for the product at this point in the supply chain, and site specification. Observe that the business function, supply function, and transit fields have different descriptive characterizations.

The following pseudo code may be used to create a path characterizing changes in RF tag information.

```
PriorDesignation := null
Path:= ""//initially an empty path
While (remaining raw events) {
    CurrentEvent := nextRawEvent
    CurrentDesignation = Lookup Designation based on CurrentEvent,
        Level, and Table of Levels
    If(CurrentDesignation different from Prior Designation) {
        Path = Path & "→" & CurrentDesignation
    }
    PriorDesignation := Current Designation
}
```

The application of this pseudo code to the data of FIG. 5 results in the path data of FIG. 6. Observe that the logic is initially applied to the bottom (row 13) of the raw data. Each row represents an event. The path at each stage of processing is shown. Additions to the path occur at event E1, E2, and E6.

In FIG. 6 there are 4 instances of a manufacturing→distribution path. These four instances have common product transition characteristics. There are 3 instances of a manufacturing→distribution→retail path. These three instances have common product transition characteristics. In a more complex example, individual retailers, distributors, and manufacturers can be specified. In such a case, common product transition characteristics would be those that have common specific retailers, distributors, and manufacturers. Alternately, one could define common product transition characteristics as having specific retailers and distributors, but any manufacturer. Any variation of such path definitions may be defined in accordance with the invention.

Various forms of logic may be applied to paths created in accordance with the invention. For example, path analysis can be used to determine many important aspects of the state of a supply chain. A basic objective in supply chain analysis is to gain visibility of all the goods of interest. When optimizing the quantity to manufacture, order, or ship it is desirable to know both the quantities at each location within the supply chain and also their disposition. Are the products available for sale or are they being returned? Have the tagged cases shipped to a particular retail store, been unpacked, stocked on the shelves, and passed to the trash compactor (signifying the end-of-life for the case)?

In the simple example below, for a given time period and selection of products, a total of 900 products have been issued into the distribution chain. Path analysis shows that 237 products have reached the distributor and therefore should be available to be shipped to a retail establishment. A total of 593 products have passed through a distributor to reach retail. A further 70 products have been reported as sold to a consumer (through a point-of-sale tag reader, for example).

| Path | Quantity |
|---|---|
| Manufacturer→Distributor | 237 |
| Manufacturer→Distributor→Retailer | 593 |
| Manufacturer→Distributor→Retailer→Consumer | 70 |
| | 900 |

By considering the rate of change of these categories over time, the velocity (products per unit of time) is computed. This is a direct measure of product flow. Flow at the consumer level is a direct measure of consumer demand. If the flow in the supply chain is unbalanced in the direction of incoming supply exceeding demand, then inventory will accumulate and eventually orders must stop. If demand exceeds supply, then eventually the supply chain is drained and the product will be out-of-stock.

In accordance with the invention, supply chain logic is used to characterize supply chain phenomenon, such as product velocity. This supply chain logic is in the form of executable instructions used to analyze supply path transitions to facilitate the computation of supply chain metrics, such as product velocity.

Replenishment logic may also be applied to supply paths processed in accordance with the invention. For many products, being out-of-stock at the retail shelf level leads to loss of sales for that manufacturer as well as for the specific product. In addition to the immediate problem of losing sales, consumers may find a substitute within the store—this can lead to a long-term loss of a customer for the out-of-stock brand. If the consumer does not find a satisfactory substitute the consumer may leave without a purchase and possibly be a long-term lost customer for the store. Hence, avoiding stock absence at the shelf level is a primary objective of both manufacturers and retailers. Consider the following paths identified in accordance with the invention.

Mfg→DistributionCenter

Mfg→DistributionCenter→Backroom

Mfg→DistributionCenter→Backroom→FrontRoom

This example illustrates possible paths for retail products to reach the shelf. Replenishment of the shelf may be triggered by executable instructions that make calculations based on point-of-sale consumption information and an estimated current inventory. Alternately, replenishment decisions may be made using executable instructions that track physical shelf inventory.

Using executable instructions to analyze the timing of the foregoing paths, a manufacturer can detect that a product has not been replenished for over a preset period of time. The preset time may be based on past history at a level that will avoid most false alarms, but provides a prompt indication of trouble. The preset time being exceeded can indicate that for some reason no shelf replenishment is taking place. Further analysis may determine that there is no backroom stock or that there is a procedural failure within the store. Thus, various tests may be executed to avoid replenishment failure.

The invention is also successfully exploited in connection with trade promotion. Trade promotion payments are a common method used by manufacturers to pass incentives to retailers to promote and discount products to improve sales. Promotional agreements may be in the form that the retailer agrees to sell an extra N units of the product if the manufacturer provides a promotional payment of $X per unit. In some cases, a retailer may accept the agreement, take delivery of the N additional units, and then sell all or part of the additional units to another retailer at just below the normal wholesale price. This violates the trade promotion agreement and renders the retailer ineligible to receive the payments. Consider the following example.

| | |
|---|---|
| Mfg→DistributionCenter→StoreA | Expected Flow |
| Mfg→DistributionCenter→StoreB | Possible violation of promotional agreement |
| Mfg→DistributionCenter→StoreA→StoreB | Violation of promotional agreement |

Path analysis can be used to determine if the retailer is in compliance with trade promotion rules. The table above shows both the expected, normal flow for orders to this retailer, and several variants that indicate a possible attempt to violate the agreement and fraudulently claim trade promotion payments. Thus, in accordance with an embodiment of the invention, executable code is used to identify product flow paths that violate trade promotion criteria. For example, the trade promotion criteria may be in the form of permissible trade path templates. Existing flow paths may then be compared to the permissible trade path templates. In the event of a mismatch, a product flow exception is fired.

The invention is also successfully used in connection with taxation issues. Where taxation levels vary widely between regions, there is a strong incentive to pay taxes in low taxation states and then sell the after tax products in high taxation states. This is particularly prevalent with cigarettes in the US and many other parts of the world. In accordance with an embodiment of the invention, path analysis is used to detect non-compliant movement of taxed goods. A simple example is shown below, where products intended for Nevada, and have tax paid in Nevada, are diverted to California.

| | |
|---|---|
| Mfg→NevadaDistribution→NevadaTaxPayments→NevadaRetail | Compliant |
| Mfg→NevadaDistribution→NevadaTaxPayments→CaliforniaRetail | Non-Compliant |

Thus, in accordance with an embodiment of the invention, a compliant taxation path template is created and is tested against various existing product paths to identify potentially non-compliant situations.

In addition to taxation compliance, the invention is successfully used in connection with regulatory compliance. There are numerous regulations on the movement of certain kinds of products. For example, it is currently illegal to re-import pharmaceuticals from other countries. Below is an example of a compliant trade and a non-compliant trade.

| | |
|---|---|
| USA→Canada→Retail Sale | Compliant |
| USA→Canada→USA→Retail Sale | Non-Compliant |

Thus, in accordance with the invention, once paths are defined, they may be tested for boundary transitions (e.g., Canada to USA) that do not comply with regulatory requirements. In particular, executable instructions associated with the data analysis module 312 may be used to identify non-compliant activity of this type.

It is also against FDA regulations for pharmaceuticals to be sold to a "closed-door pharmacy" and then be redistributed. Below is an example of compliant and non-compliant activity of this type.

| | |
|---|---|
| Mfg→Distributor→Closed-Door Pharmacy | Compliant |
| Mfg→Distributor→Closed-Door Pharmacy→Distributor | Non-Compliant |

Executable instructions may be used to identify redistribution from a closed-door pharmacy, in accordance with an embodiment of the invention.

The invention is also successfully used in accordance with recall initiatives. Products in the market place may be recalled for many reasons. Shipments of meat may be contaminated, pharmaceuticals may have a bad batch, cigarettes may be contaminated by poor production control during manufacture or even have there taste altered by proximity to other products, like detergent.

The path analysis techniques of the invention can aid recall initiatives in a number of ways. In one embodiment of the invention, basic steps in the recall process include:

1. Identify that a certain set of goods must be recalled and note the serialized identification of these products.
2. Issue a "Recall" operation on all of the affected products.
3. Analyze the paths of the affected products to identify their current locations
4. Notify representatives at the current locations
5. Where recalled products are found, the operation "Return to Manufacturer" should be performed.

Once the above operations are taken, the continued operation of the recall may be monitored via path analysis. The primary objective is to ensure that the products are removed from the supply chain. An additional objective is to ensure that the products are physically returned to the manufacturer (or otherwise disposed of). It is also important to correctly credit those who return recalled products. Below are various examples of how path analysis associated with the invention can be used in connection with recall initiatives.

| | |
|---|---|
| Commission→Ship→Receive→Recall→Return→Receive at Mfg | Credit |
| Commission→Ship→Receive→Recall→RetailSale | Alert -No Credit |
| Commission→Ship→Receive→Recall→Return→RetailSale | Alert -No Credit |

The invention is also successfully used in connection with solving problems associated with cross-contamination. Cross-contamination occurs when one batch of products adversely impacts an adjacently positioned batch of products. Cross-contamination also occurs as a result of a specific event, such as spilling of a cleanser, which impacts all susceptible products within the region of the spill. The contamination may not be discovered until later, for example, when a smoker complains that the cigarette smells "funny".

In one embodiment of the invention, the basic steps to resolve a cross-contamination problem include:

1. Exemplar product is reported and confirmed.
2. Use path analysis on this exemplar product to find its complete history.
3. Track back through that history to find where the contamination occurred.
4. Identify the approximate time period of the contamination.

5. Use path analysis both at the location level and intersect this with time information to identify all other products which were in the same place at the same time as the contamination.
6. Issue a recall on all the potentially contaminated products.

These operations maybe implemented as a set of executable instructions associated with the data analysis module 312.

The invention is also successfully used to solve product obsolescence problems. Product obsolescence can be a health regulation compliance issue to avoid selling products that have exceeded their shelf life. Product obsolescence is also a commercial issue because most retailers will not accept, or pay for, products that do not have a sufficient remaining shelf life when received. A retailer may return some products for credit if the optimal sales date is passed, for example old magazines and food products that have aged on the shelf. Product obsolescence also applies to seasonal products, like gift-wrapping and for electronic products that are superseded by a newer model.

Path analysis may be extended to allocate "pseudo" steps or events in a product path by flagging events based on the approach to the expiration of a predetermined shelf life.

| Fresh→ | OK to ship |
| Fresh→20Days | Ship these first to avoid loss |
| Fresh→10Days | Will not be accepted by retailer |
| Fresh→5Days | Mark down in store |
| Fresh→0Days | Recall |

For example, at the time of manufacturing or packaging a good, a "lifetime" value is associated with the good. Executable instructions are used to compare the lifetime value against a current date to compute the number of days remaining in the life of the product. The number of days is compared to a set of rules, for example of the type shown above, to identify actions that may or may not be taken in connection with the product.

The invention may also be used in connection with identifying unusual or problematic flow in the supply chain. That is, path analysis can be used both to look for product movement behavior that is expected and also to detect unusual behavior. Consider the following example:

| Mfg_Out→LowSpeed→HighSpeed→BackRoom→FrontRoom | Normal |
| Mfg_Out→LowSpeed→HighSpeed→LowSpeed→HighSpeed→BackRoom→FrontRoom | Recirculation on conveyor |

This real world example shows two different paths through the same retail distribution center using an automated conveyor system. The first entry is a normal path showing the products taking one trip on the low speed and high speed conveyors. The second path shows that the products took additional trips on the conveyors. Investigation showed that this was because the conveyor system would recirculate products if it did not successfully read the bar codes on the cases. A similar analysis may show recirculation in the supply chain where products go through the same distribution center multiple times. This may indicate an attempt to defraud on trade promotion payments. Thus, a flow pattern that is inconsistent with expected flow patterns, may trigger an exception, even if it is unknown what the problem is or the nature of the exception.

The invention is also successfully used in connection with the identification of counterfeit goods. Counterfeit detection is an important problem for pharmaceuticals in the USA and worldwide. Other products, such as cigarettes and fashion items, are also susceptible to counterfeiting.

Various path analyses in accordance with the invention may be used to detect counterfeit goods. For example, consider a situation in which a manufacturer of a legitimate product uses a commission tag. In this case, all products without a tag are suspect.

| Commission→Ship→Receive→RetailSale | Compliant product |
| Receive→RetailSale | Not Compliant - Counterfeit |

In this example, executable instructions are used to identify the absence of a commission event in a path.

The techniques of the invention may also be used to identify unauthorized product importation. All instrumented product movements establish a path for a product. These paths can be analyzed to detect unauthorized movements. For example:

| USA→Canada→Retail | Authorized |
| USA→Canada→USA→Retail | Not Authorized |

Again, executable instructions are used to identify impermissible boarder transitions.

Those skilled in the art will appreciate that various techniques may be used to implement the path analyses of the invention. Regular expressions are one exemplary way to match specific path expressions to discover targeted behavior. Other approaches include using graphical manipulation to build descriptions of paths that can be matched by a simple equality.

Regular expressions are a well-established mathematical way of expressing a grammar that may be used to recognize a sequence of tokens. It has been demonstrated that a finite state machine, for example any real world computer, can recognize anything expressible as a regular expression. This means that in a rather fundamental sense, regular expressions are the most powerful practical way to express patterns of states. Regular expressions are mathematically equivalent to state sequence diagrams of arbitrary finite complexity.

Regular expressions are very powerful but also may be complex to evaluate. There are variations in regular expression syntax. By way of example, the Java regular expression package may be used. An exemplary subset of the syntax is shown below.

X? X, once or not at all
X* X, zero or more times
X+ X, one or more times
X{n} X, exactly n times
X{n,} X, at least n times
X{n, m} X, at least n but not more than m times Logical Operators
XY X followed by Y
X|Y Either X or Y
(X) X, as a capturing group Predefined Character Classes
Any character Character Classes
[abc] a, b, or c (simple class)
[^abc] Any character except a, b, or c (negation)

Relying upon this syntax, various rules can be concisely expressed. For example, suppose that it is desirable to express that distribution within the USA, and also from the USA to Canada, is acceptable. In this case, the following regular expression may be used.
USA+→(USA|Canada+)

This pattern would accept distribution within the US
USA→USA→USA→USA→

And also from the US into Canada
USA→USA→USA→USA→USA→USA→USA→
 Canada→Canada

But, it would reject re-importation into the US
USA→USA→USA→USA→USA→USA→USA→
 Canada→Canada→USA This example demonstrates how a simple single expression or rule can be used to test a variety of product paths, in accordance with the invention.

A regular expression can also be formed to define non-compliant distribution. The following expression precludes re-importation into the US.
USA+→[^USA]+→USA+

This expression will match any product path that starts in the US, leaves the US (^USA) and then returns to the US.

A regular expression may also be used to characterize the normal life cycle of a product. Consider the following exemplary life cycle:
Commission→Sight*→Pack{1}→Sight*→Unpack{1}→
 Sight*

Similarly, non-compliant life cycle events may also be defined, such as:
.*→Commission→.*→Commission→.*

The above expression will match any sequence that includes two or more commission operations on a tag. Similarly, it would be non-compliant for a tagged object to be packed twice, without an intervening unpack.
.*→pack{1}→[^unpack]*→pack+.*

Consider the diversion or re-circulation of a product that is not in compliance with marketing agreements. The following regular expression may be used in this situation.
Manufacturer+→DistributorLevel1+→DistributorLevel2+
 →Retail+

The regular expression above may be a compliant path for a specific industry. The regular expression below will match any re-circulation from level 2 back to level 1.
.*DistributorLevel2+→+.*→DistributorLevel1+

The following regular expression will match any re-circulation from the retail level backwards through the supply chain.
.*→Retail+→.*→
 DistributorLevel1|DistributerLevel2|Manufacturer→.*

A variety of regular expressions may be used to identify counterfeit activity. For example, any tag history that does not begin with a commission event from an authorized source can indicate a fraudulent tag introduced into the supply chain. The following regular expression identifies a product path that does not include the appropriate commission tag.
^Commission→.*

The following regular expression detects a situation where a counterfeiter copies the tag of a product distributed in Western US and then introduces the product in another region.
.*→WesternRegionDistribution→.*→^ WesternRegionDistribution Regular expressions may also be used for period based event detection. Consider the following transit times:
1:06:27→3:01:25→4:03:33

This information is difficult to match against a simple regular expression. The information can be recast in an approximated form by simply representing each day as say, D.
D→DDD→DDDD One could then look for any transit times that were suspiciously long:
.*→D{5,}→.*

The foregoing expression matches any transit time of 5 days or longer.

Those skilled in the art will appreciate that the paths formed in accordance with the invention may be analyzed using any number of techniques, including analysis of product transition events, testing of product sources, tracking of product locations, analysis of product history, and scrutiny of product statistics. Other product path events that may be analyzed include product transition boundary information, product absolute resident time information, and product transit information.

Figure 7:
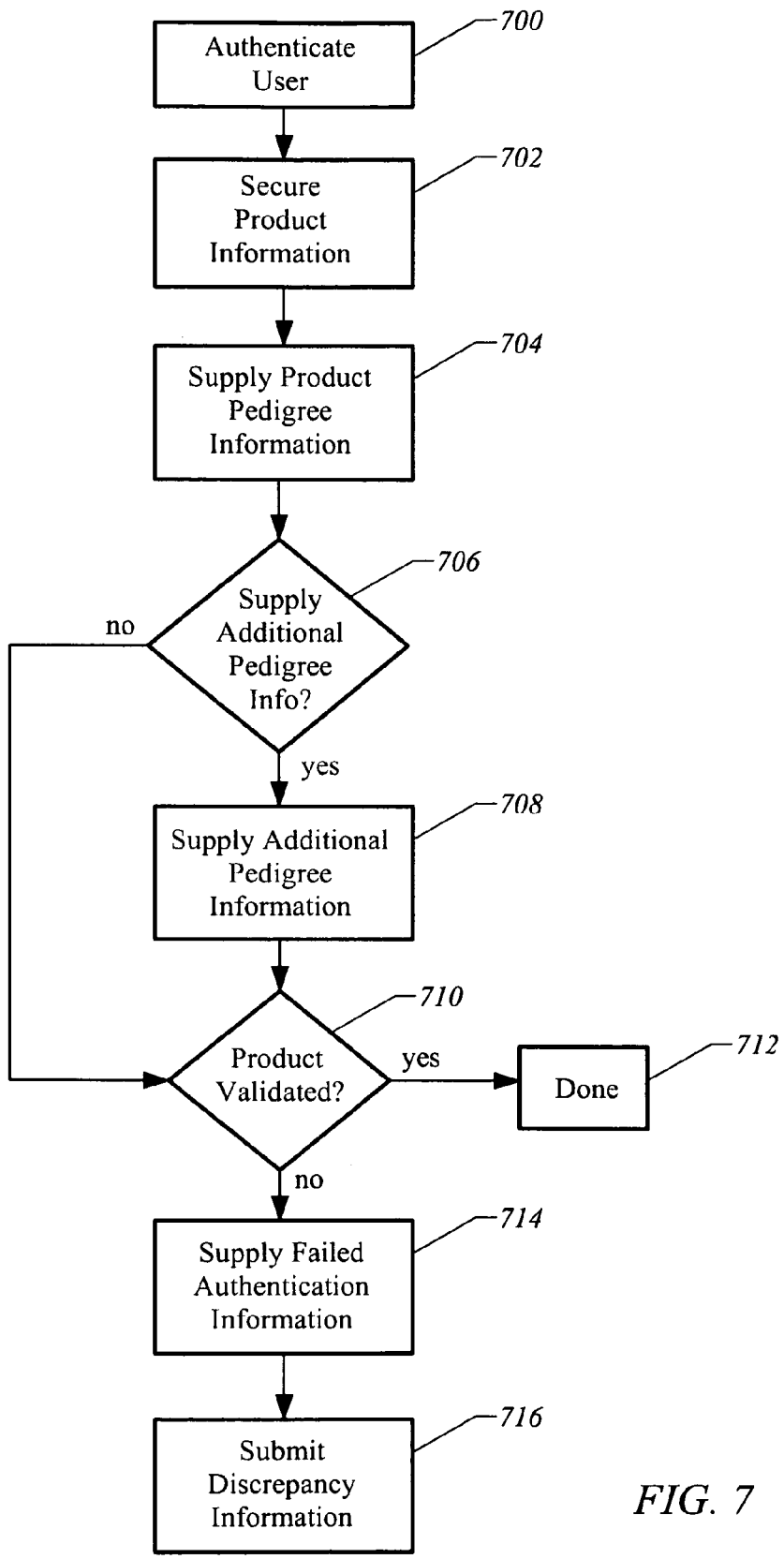
FIG. 7 illustrates processing operations associated with an embodiment of the invention.

FIG. 7 illustrates processing associated with a product authentication technique of the invention. The product authentication technique may be implemented as a set of executable instructions forming a portion of the data analysis module 312. By way of example, the technique will be disclosed in the context of authenticating a prescription drug, but the technique is not so limited, as it is applicable to any type of product authentication.

Figure 8:
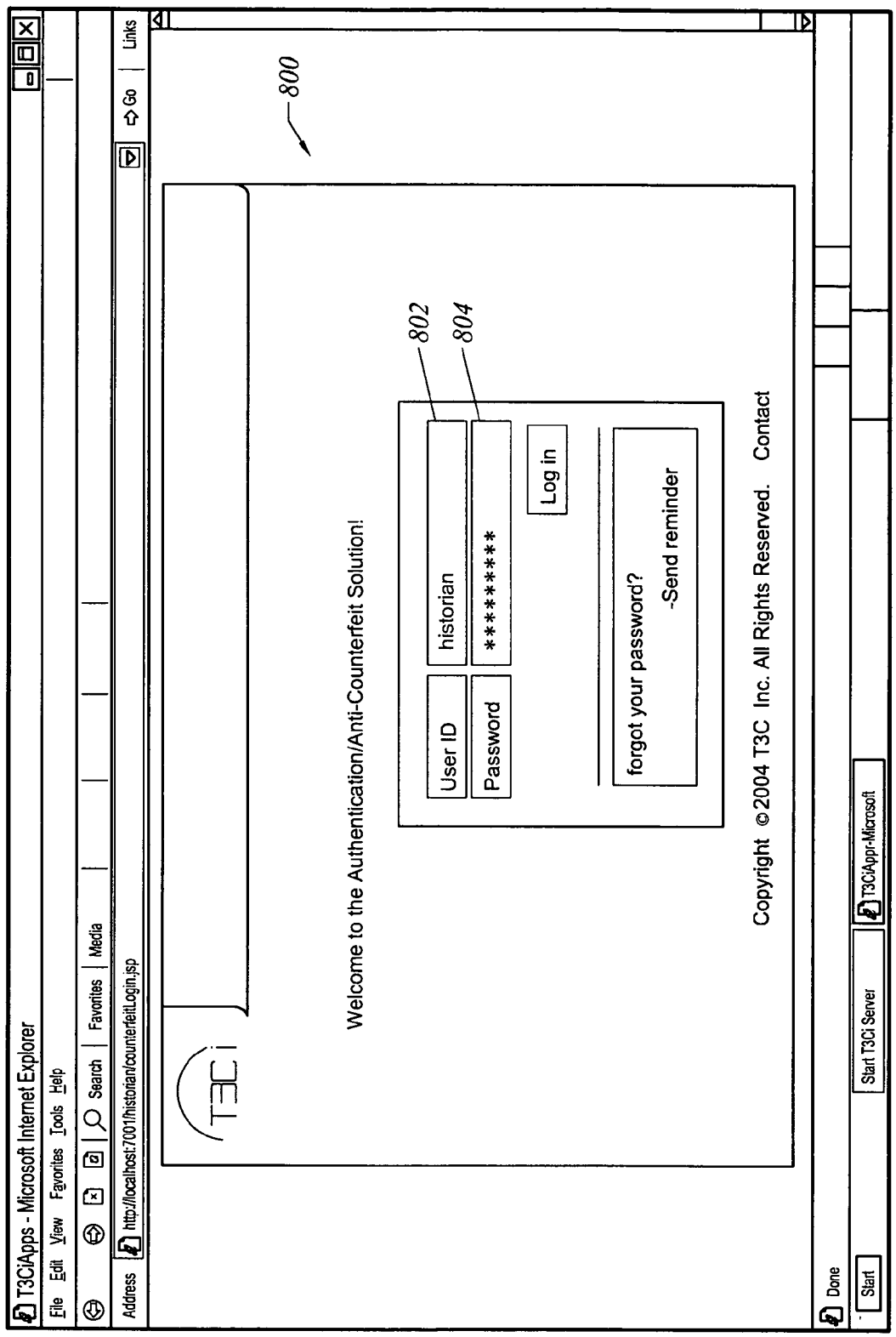
FIG. 8 illustrates a user interface to initiate the processing associated with FIG. 7.

Initially, a user is authenticated 700, as shown in FIG. 7. FIG. 8 illustrates a user interface 800 that may be used to support this function. The user interface 800 includes an input block 802 for a user ID and an input block 804 for a user password. In this embodiment, access to serialized object information is limited to authorized users. The user has to supply a user name and password to gain access to the information regarding serialized pharmaceutical drugs. As discussed below, each user has a prescribed information access level.

Figure 9:
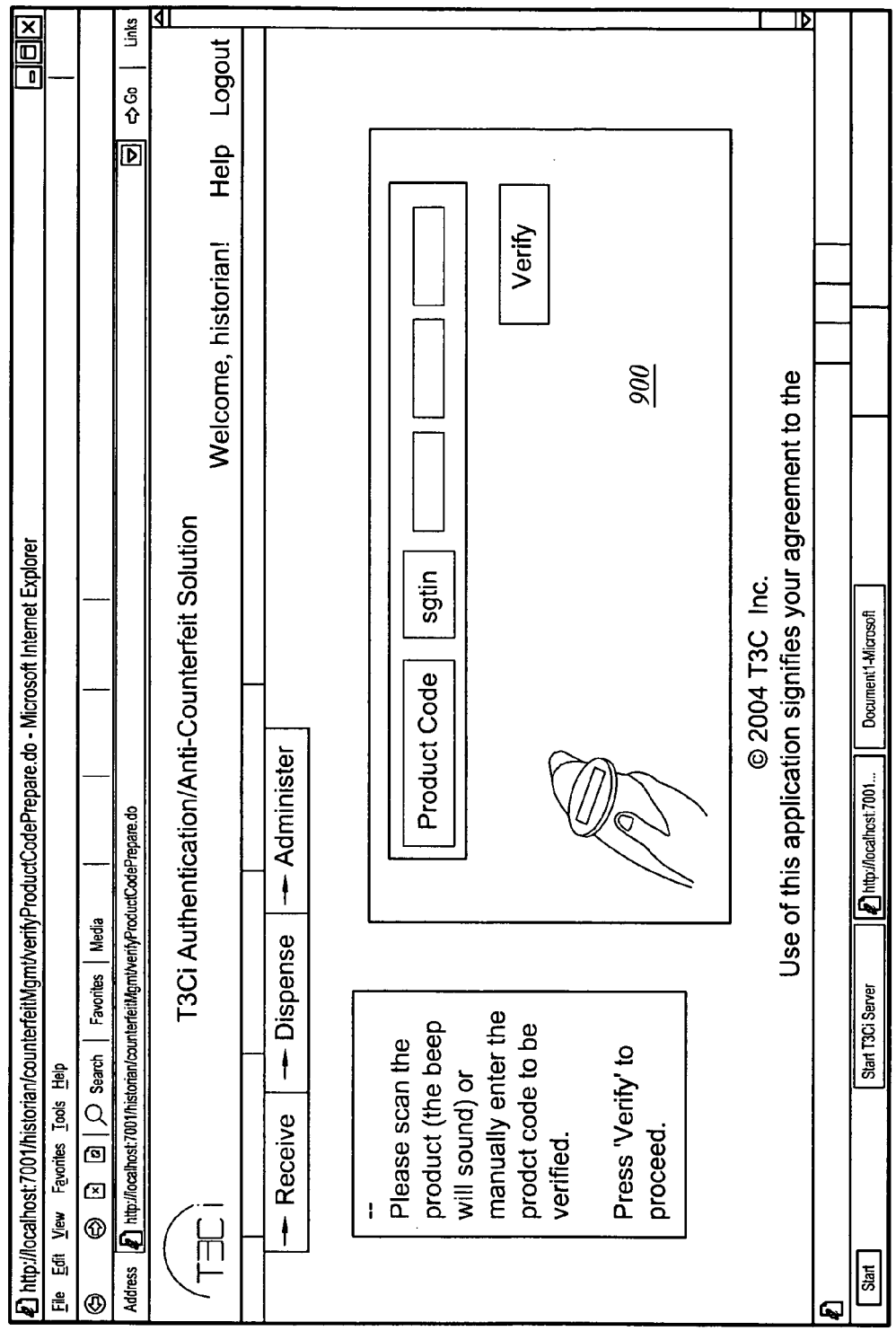
FIG. 9 illustrates a user interface to secure product information in accordance with an embodiment of the invention.

Returning to FIG. 7, the next operation is to secure product information 702. FIG. 9 illustrates a user interface 900 that may be used to support this function. The user is prompted to scan or manually enter the Electronic Product Code (EPC) or the serialized data in order to facilitate access to the relevant information, such as by accessing the information over the Internet. The EPC includes a manufacturer's prefix, a product prefix and a serial number.

Figure 10:
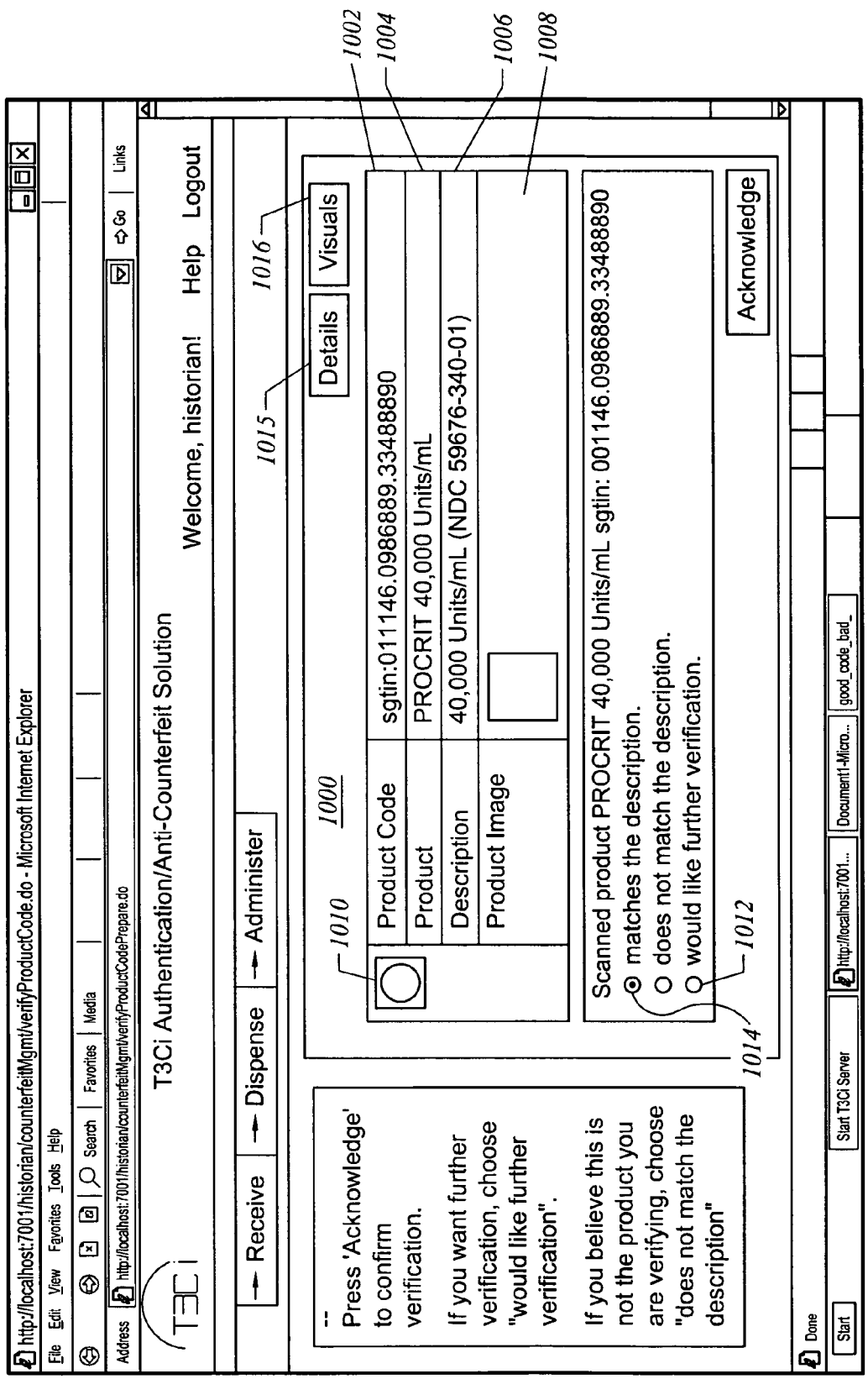
FIG. 10 illustrates product pedigree information supplied by a system configured in accordance with an embodiment of the invention.

The next processing operation of FIG. 7 is to supply product pedigree information 704 for the specified product. The data analysis module 312 processes the RF Tag information and other available information to supply the product pedigree information for the specified product. FIG. 10 illustrates an example of product pedigree information 1000, including a product code 1002, a product name 1004, a product description 1006, and a product image 1008. A visual indicator, such as a green light 1010 may be used to indicate an authenticated product. Details button 1015 may be used to access additional pedigree information. In one embodiment, this additional pedigree information may only be accessed by users with appropriate security clearance. Information access levels associated with embodiments of the invention are discussed below. The visuals button 1016 may be used to access visual information.

FIG. 11 illustrates additional product pedigree information that may be supplied in accordance with an embodiment of the invention. The top panel 1100 of FIG. 11 provides information on whether the product is recalled, damaged, stolen, expired, returned, quarantined, lost or destroyed. The bottom panel 1102 provides pedigree information in the form of events, locations, license numbers and dates. Information can also be provided with respect to such facts as whether the EPC is a duplicate, whether the EPC has been consumed or de-commissioned, whether the EPC has a valid commission event at the authorized business entity, whether the EPC has followed an expected path (e.g., it is not re-imported, it does not belong to a serialized product that has been sold from "unauthorized" locations such as a closed pharmacy), and whether the EPC entered has a good chain of custody (i.e., documentation of ownership and transfer of the product throughout the supply chain).

Figure 12:
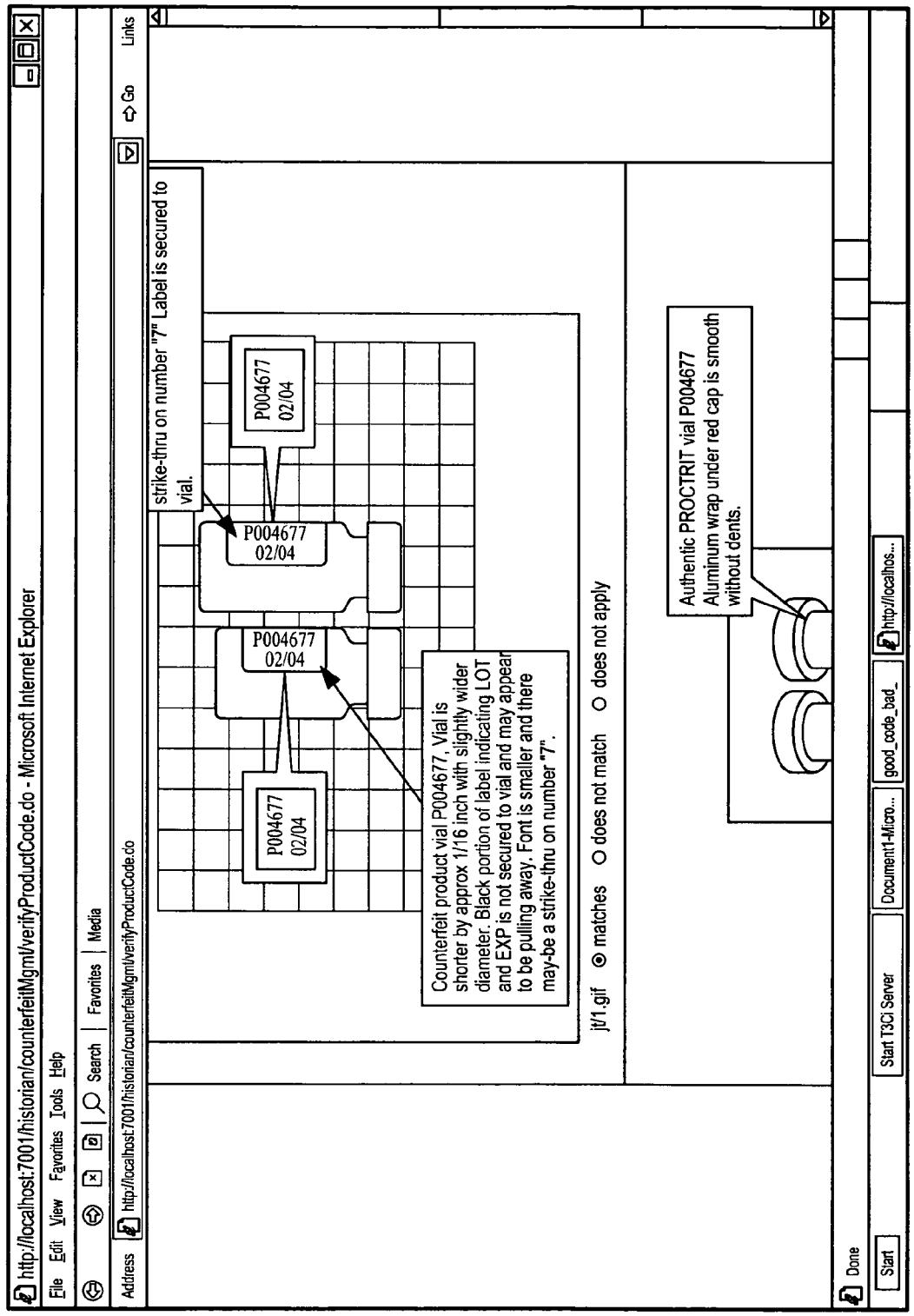
FIG. 12 illustrates additional product visual inspection information supplied in accordance with an embodiment of the invention.

Returning to FIG. 7, the next processing operation is to determine whether additional pedigree information should be supplied 706. This may be implemented, for example, using the button 1012 of the user interface of FIG. 10. If this button is selected, additional pedigree information is provided 708. By way of example, FIG. 12 illustrates additional information in the form of a product visual and instructions to facilitate the identification of a counterfeit product.

Figure 13:
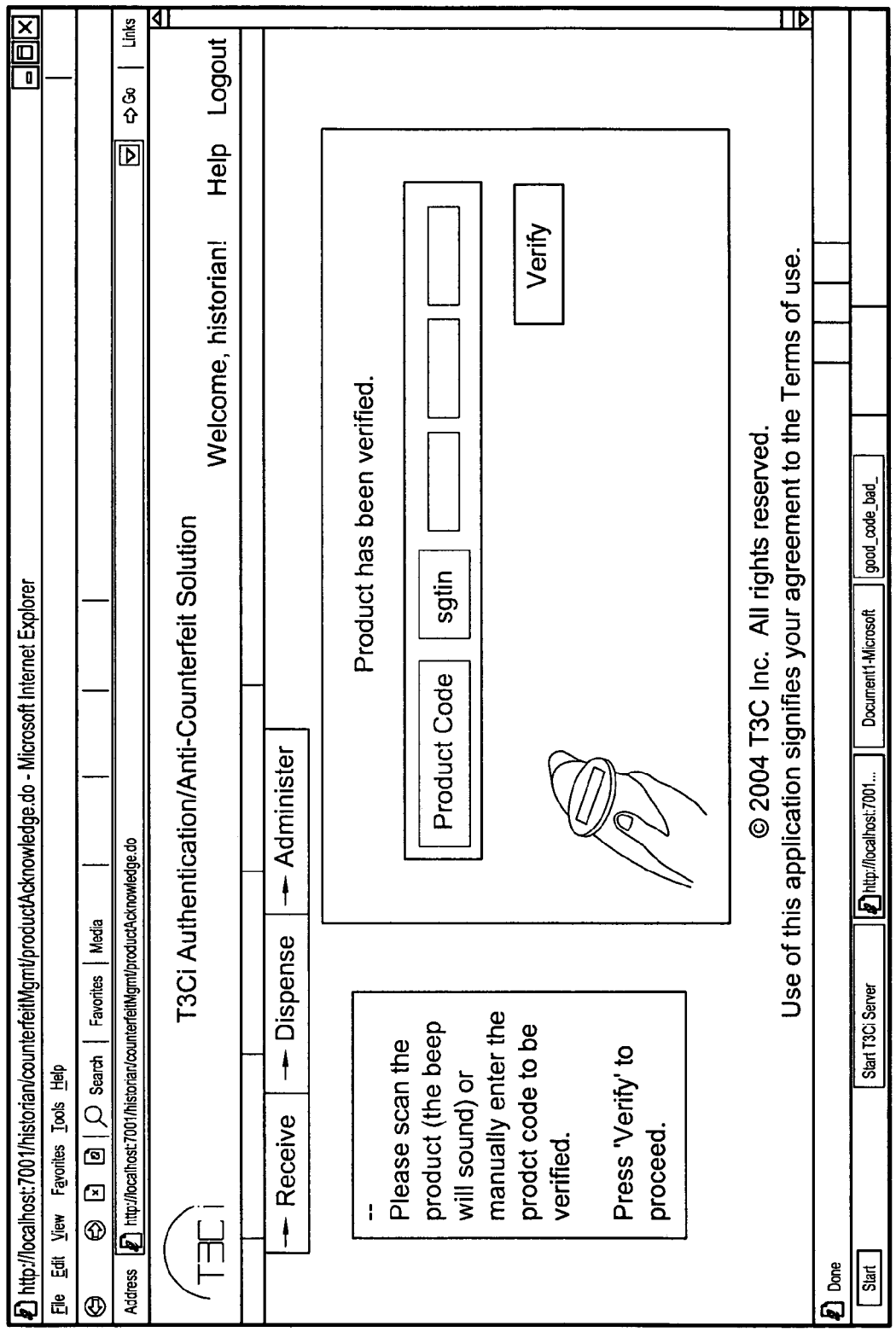
FIG. 13 illustrates a user interface to confirm product verification.

Returning to FIG. 7, at this point a determination can be made on whether a product is validated. This may be done programmatically, as shown in FIG. 10, where button 1014 indicates that the product is matched and verified. A separate user interface, such as shown in FIG. 13 may also be used. Alternately, or in addition, user input may be used in this determination. If the product is validated, then processing is completed 712. If the product is not authenticated, then failed authentication information is supplied 714. FIG. 14 illustrates an example of failed authentication information. Panel 1400 of FIG. 14 indicates that the product has a problem. Panel 1402 provides information on how the product should be handled. In one embodiment, the user is solicited for discrepancy information 716. FIG. 15 illustrates a user interface to receive discrepancy information. Panel 1500 solicits contact information, invoice information, information on when the product arrived at the specified location, whether more units are in stock, and whether a shipment has been administered. A submit button 1502 allows the user to supply the discrepancy information so that it may be processed to identify vulnerabilities in the supply chain. The information is also used to generate an alert to other potentially impacted users.

Those skilled in the art will recognize that the system maybe successfully utilized by any number of users with different prescribed information access levels. For example, a drug manufacturer's agent may authenticate a product in a pharmacy with a hand held scanner. This user may have privilege to look at all the information related to the drug from the point of commissioning. A retail pharmacy may use the system to confirm that the drug that they are selling to a consumer is authentic. The information provided in this case could be limited to knowing only whether the drug is authenticated by the system, and who the supplier was. In a doctor's office, a nurse may want to authenticate the medicine being administered to a patient. The information provided in this case could be limited to knowing only whether the drug is authenticated by the system and who the supplier was. An end customer may want to know if a drug purchased from a mail order store is authentic. In this case, supplied information may be limited to whether the drug is validated.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer readable medium including executable instructions to analyze radio frequency (RF) tag information, comprising executable instruction to:
   access cross-enterprise RF tag information, wherein cross-enterprise RF tag information includes RF tag information characterizing product movement from a first enterprise to a second enterprise, wherein said first enterprise and said second enterprise are selected from a manufacturer, a warehouse, a distributor and a retailer;
   identify a product transition based upon said cross-enterprise RF tag information;
   define a new product path based upon said product transition, said new product path defining product pedigree information;
   authenticate a user through a graphical user interface;
   secure product information;
   supply product pedigree information corresponding to said product information at said graphical user interface; and
   verify the pedigree of a product based upon said product pedigree information.

2. The computer readable medium of claim 1 wherein said executable instructions to supply product pedigree information include executable instructions to supply additional product pedigree information in response to a user request.

3. The computer readable medium of claim 2 wherein said executable instructions to supply additional product pedigree information include executable instructions to supply information indicating visual characteristics of an authentic product.

4. The computer readable medium of claim 1 wherein said product pedigree information includes information selected from a product code, a product description, and a product image.

5. The computer readable medium of claim 1 wherein said product pedigree information includes information selected from information indicating whether a product is recalled, damaged, stolen, expired, returned, quarantined, lost and destroyed.

6. The computer readable medium of claim 1 wherein said product pedigree information includes information sequentially specifying a product event, location, and date.

7. The computer readable medium of claim 1 further comprising executable instructions to supply failed authentication information.

8. The computer readable medium of claim 7 wherein said failed authentication information includes information specifying actions to be followed in connection with the disposal of the product that failed authentication.

9. The computer readable medium of claim 1 further comprising executable instructions to solicit discrepancy information from a user.

10. The computer readable medium of claim 9 further comprising executable instructions to process said discrepancy information to identify flaws in a supply chain.

11. The computer readable medium of claim 1 wherein said executable instructions to authenticate include executable instructions to authenticate to a prescribed information access level.

* * * * *